Mar. 27, 1923.
W. H. DENT
VALVE
Filed Dec. 1, 1920.
1,449,590
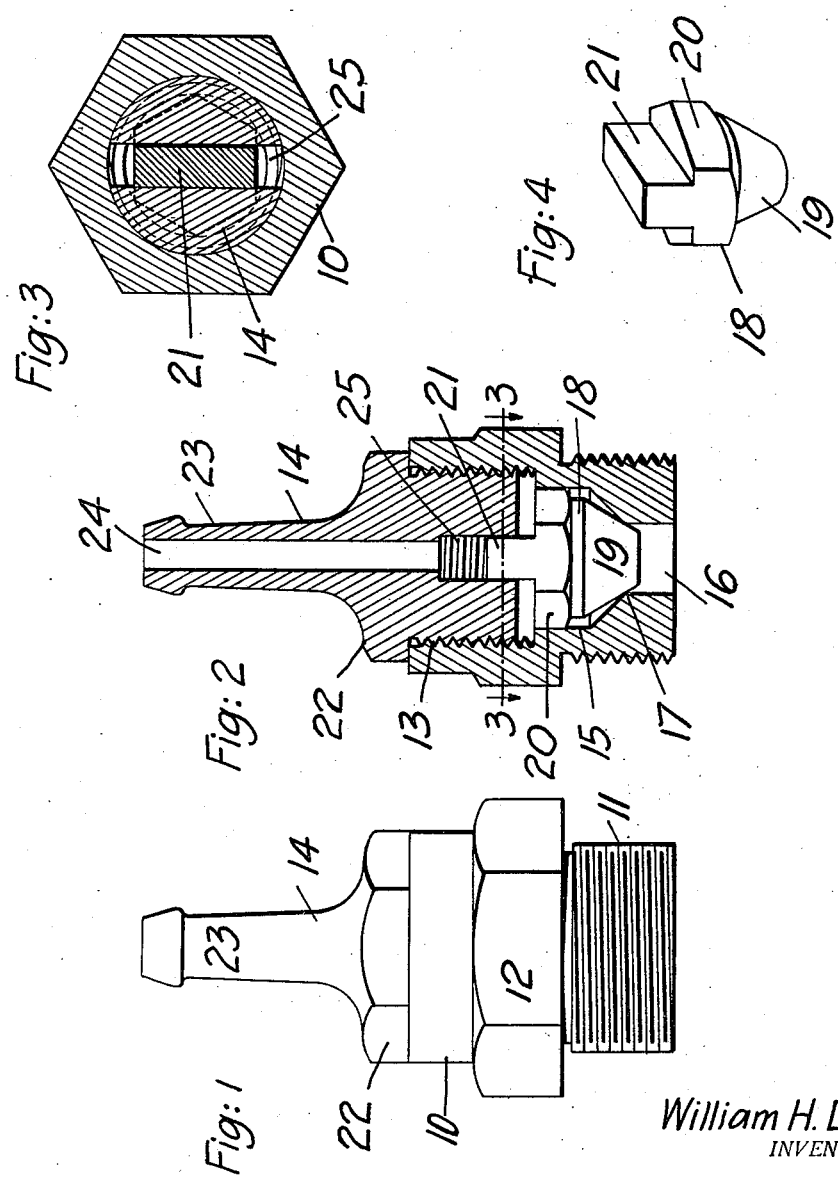
William H. Dent
INVENTOR.
BY *Walter E. Wollheim*
ATTORNEY.

Patented Mar. 27, 1923.

1,449,590

UNITED STATES PATENT OFFICE.

WILLIAM H. DENT, OF BERGENFIELD, NEW JERSEY, ASSIGNOR TO THE ANTHONY COMPANY, OF LONG ISLAND CITY, NEW YORK, A CORPORATION OF NEW YORK.

VALVE.

Application filed December 1, 1920. Serial No. 427,585.

*To all whom it may concern:*

Be it known that I, WILLIAM H. DENT, a citizen of the United States, and a resident of Bergenfield, in the county of Bergen and State of New Jersey, have invented certain new and useful Improvements in Valves, of which the following is a specification.

This invention relates to new and useful improvements in valves and particularly in valves, the construction of which and process of fitting, are set forth in Letters Patent No. 1,006,852 issued October 24, 1911, to Edgar A. Kelsey.

It has been found that valves made tight by reversely producing the minute imperfections in the seating surfaces of valves and their seats, are of great commercial importance because of their simplicity of design, reliability of service, and high operating efficiency. By referring to the specification of the above mentioned Letters Patent, it will be seen that such valves are set in position on seats of valve bodies and are provided with means to guide them to this exact position at the end of each operating cycle, and are then pressed into this position so that every projection in the seating face of valves makes a corresponding depression in the valve seats of valve bodies, and vice versa.

All manufacturing processes involved in so doing are elementary. The elimination of valve grinding, permits of a high rate of production and consequent low cost. A fluid tight joint is obtained with astonishing ease and regularity.

The efficiency of these valves depends chiefly upon the construction employed to guide the discs to the exact position on seats into which they have previously been pressed. The minute projections must fall into corresponding depressions at each seating. The slightest turning or shifting out of this original inpressed position must be avoided. If this is permitted to occur, both projections and depressions become obstacles which prevent seating and cause leakage.

It is the particular purpose of this invention, to provide means for accurately guiding valve discs into fitted position in a simple and efficient manner and to embody the same in a valve of sturdy and reliable construction.

The invention is illustrated in the accompanying drawing in which—

Fig. 1 is an elevation of the valve;

Fig. 2 is a longitudinal sectional view of the valve;

Fig. 3 is a cross sectional view along the plane of line 3—3 in Fig. 2; and

Fig. 4 is a perspective view of the valve member proper.

Like numbers of reference denote similar parts throughout the drawings and the following specification.

10 is a valve casing, having an end threaded exteriorly at 11; 12 is a center section of casing 10, polygonal in shape, to facilitate gripping the casing 10 to screw its threaded end 11 into a desired place of application. Casing 10 is tapped interiorly at one end at 13 to receive an outlet member 14. 15 is a central bore through casing 10, below the threaded part 13 and concentric therewith. The lower end of bore 15 is reduced to an inlet passage 16. 17 is a valve seat in the casing 10.

18 is a valve, its lower tapering portion 19 adapted to seat against valve seat 17. 20 is a part of the valve somewhat larger than the tapered portion 19, adapted to slide within bore 15, part 20 being polygonal in cross section, as plainly shown in Fig. 4. 21 is an oblong projection above 20. Parts 19, 20 and 21 are centrally disposed to each other, i. e., are in axial alignment.

Outlet member 14 is provided with a hexagonal center section 22 to enable the same to be screwed into casing 10. 23 is an extension of outlet member 14 adapted to fit within a suitable flexible pipe. 24 is a central bore through outlet member 14, and 25 is a slot through the inner threaded end of the outlet member, to slidably receive projection 21 of the valve 18.

The process of assembling the valve is as follows: The valve 18 is placed into the casing 10 and the outlet member 14 screwed down wrench tight. A small tool is then inserted through the bore 24 until it strikes the top of projection 21 of valve 18. It is then tapped slightly in order to reversely reproduce in the face of the tapered portion 19 of valve 18 and valve seat 17 of the casing the minute imperfections.

In actual operation, fluid or air under pressure, is introduced below the valve 18 through bore 16. The valve 18 is then lifted from its seat and the liquid or air discharged past the polygonal sides of valve 18 and past the ends of projection 21 into outlet bore 24 of outlet member 14.

Attention is particularly directed to the large and long bearing part of the valve 18 at 20 within the casing which in connection with the guiding projecton 21 compels the close and accurate seating of the valve. The slot 25 of outlet member 14 is milled accurately to fit projection 21 and inasmuch as the guide projection or bearing within this slot and the bearing part 20 above the tapered portion of the valve is greater in dimension than the largest diameter of said tapered part, of the valve proper, the small variations met with in machine operations produce practically no effect at the valve seat which is considerably smaller in diameter.

In the drawings has been illustrated the application of the principles of the invention to a valve used as check valve of a tire pump. It is obvious that the construction may be varied to suit many other purposes, and it should be understood that various changes of form, proportion and minor details may be resorted to without departing from the principle or sacrificing any of the advantages of the invention as defined in the appended claims.

What I claim as new, is:

1. In a device of the character described, a valve casing, a valve and a valve seat, said valve comprising a seating face, a bearing part engaging the casing and larger in diameter than the seating face, and means for guiding the valve to seat in the same position in which it was fitted to its seat.

2. A valve consisting of a valve casing and an outlet member, a valve, a valve seat, said valve comprising a bearing part engaging the casing larger in diameter than the valve seat, and an oblong projection on the valve slidably arranged within a slot of the said outlet member whereby the valve is accurately guided into a fitted position.

3. A valve comprising a valve casing having a valve seat, a valve having a conical seating face, a bearing surface engaging the casing, polygonal in section and larger in diameter than the valve seat, and a projection of rectangular cross section for the purpose of guiding the valve to seat in the same position in which it was fitted to its seat.

4. In a valve, a valve casing and an outlet member, a valve seat, a valve having a conical seating face, and a bearing surface engaging the casing polygonal in section and larger in diameter than the valve seat, and having a projection of rectangular cross section, the said outlet member having an open slot through its inner end for the reception of the said projection of the valve to guide the same into a fitted position with its seat.

In testimony whereof I have hereunto set my hand and seal in presence of two subscribing witnesses.

WILLIAM H. DENT. [L. S.]

Witnesses:
ALBERT W. MORSE,
MABEL CHURCHILL.